(12) United States Patent
Datta et al.

(10) Patent No.: US 7,633,775 B2
(45) Date of Patent: Dec. 15, 2009

(54) POWER CONVERSION SYSTEM AND METHOD

(75) Inventors: Rajib Datta, Albany, NY (US); Allen Michael Ritter, Roanoke, VA (US); Kunlun Chen, Shanghai (CN); John Douglas D'Atre, Salem, VA (US)

(73) Assignee: General Electric Company, Niskayuna, NY (US)

( * ) Notice: Subject to any disclaimer, the term of this patent is extended or adjusted under 35 U.S.C. 154(b) by 331 days.

(21) Appl. No.: 11/010,147

(22) Filed: Dec. 10, 2004

(65) Prior Publication Data

US 2006/0126242 A1 Jun. 15, 2006

(51) Int. Cl.
*H02M 1/12* (2006.01)
(52) U.S. Cl. ............................. 363/41; 363/70; 318/811
(58) Field of Classification Search ............. 363/71–79, 363/65, 34–46, 95, 98; 318/256, 229, 798–813; 323/256, 208
See application file for complete search history.

(56) References Cited

U.S. PATENT DOCUMENTS

| | | | | |
|---|---|---|---|---|
| 3,970,914 | A * | 7/1976 | Salzmann et al. ............. 363/45 |
| 4,032,832 | A * | 6/1977 | Miller ........................ 363/43 |
| 4,723,104 | A * | 2/1988 | Rohatyn .................... 318/813 |
| 4,870,557 | A | 9/1989 | Stacey | |
| 5,031,086 | A * | 7/1991 | Dhyanchand et al. ......... 363/37 |
| 5,515,264 | A | 5/1996 | Stacey | |
| 5,625,545 | A | 4/1997 | Hammond et al. | |
| 5,726,870 | A | 3/1998 | Lavieville et al. | |
| 5,886,888 | A | 3/1999 | Akamatsu et al. | |
| 5,986,909 | A | 11/1999 | Hammond et al. | |
| 5,999,427 | A | 12/1999 | Dahler et al. | |
| 6,198,178 | B1 * | 3/2001 | Schienbein et al. ........... 307/82 |
| 6,262,555 | B1 | 7/2001 | Hammond et al. | |

FOREIGN PATENT DOCUMENTS

| EP | 0390184 B1 | 6/1993 |
|---|---|---|
| EP | 1 244 203 A2 | 9/2002 |

OTHER PUBLICATIONS

Engineering Circuit Analysis Third Edition by William H. Hayt, Jr. & Jack E. 1978,1971 and 1962 pp. 609-613.*
Mohan, N.; Undeland, T.; Robbins, W.: "XP002374046"; "Power Electronics: Converters, Applications and Design", 1989, John Wiley & Sons, Inc., New York, ISBN: 0-471-50537-4, pp. 387-393.
EPO Search Report dated Jan. 9, 2007.

* cited by examiner

Primary Examiner—Rajnikant Patel
(74) Attorney, Agent, or Firm—Ann M. Agosti

(57) ABSTRACT

A power generation system for supplying a resultant output voltage is provided. The system comprises a power converter system. The power converter system comprises at least two power converter bridges, each configured for switching at a low frequency and generating a corresponding converter output voltage including a fundamental voltage component and harmonic components, and at least two power converter transformers. Each power converter bridge is coupled to a primary winding of a corresponding power converter transformer and a secondary winding of one power converter transformer is coupled to a secondary winding of a second power converter transformer. The resultant output voltage comprises a sum of the fundamental voltage components of each converter output voltage.

36 Claims, 5 Drawing Sheets

POWER CONVERSION SYSTEM AND METHOD

BACKGROUND

The invention relates generally to power conversion systems and more specifically to a method and system for providing high quality output power.

Many devices, such as power supply systems, include power conversion systems. A power conversion system usually comprises converter systems used to convert an input voltage which may be fixed frequency, variable frequency, or dc to a desired converter output voltage. The output voltage and frequency may be fixed or variable. A converter system usually includes several switches such as insulated gate bipolar transistors (IGBTs) that are switched at certain frequencies to generate the desired converter output voltage and frequency. The converter output voltage is then provided to various loads via transformers. Loads as used herein is intended to broadly include motors, power grids, and resistive loads, for example.

It is often desired that the converter output voltage be of high quality. More specifically, it is desired to maintain harmonic components in the converter output voltage at a minimum level. Such a state is usually attained by switching the converter systems at high frequencies.

In several applications, such as compressor drives for gas turbine driven power generators, high speed electrical machines are directly integrated to the compressor or turbine shaft without a gearbox. However, the power converter that interfaces with the machine is usually not designed to handle high power at high fundamental frequencies due to limited switching frequency of the power converter.

Typically, in power conversion systems at the megawatt level, the switching frequency of the converter is limited to few hundred cycles per second. The reduced switching frequency results in higher harmonic components in the output voltage.

The limitation in switching frequency also limits the fundamental frequency that can be achieved for high power. One way to address the limitation is to use multilevel converter topologies such as the neutral point clamped (NPC) topology, flying capacitor (FC) topology, or the H-bridge series cell (HSC) topology. The HSC topology has a higher degree of modularity allowing for increased levels in the output voltage thus allowing the flexibility of increasing the fundamental frequency. However, the HSC topology results in single phase power being reflected as double frequency ripple on the dc link. This effect results in a large value of dc link capacitance and also affects the control of the front-end/grid-side converter.

One method for reducing harmonic components in the output voltage is to increase the switching frequency of the converter system. When switching frequency is increased, there is a proportionate increase in size of heat-removal components such as heat-sinks.

Therefore, what is desired is a power conversion system that generates a high quality output voltage with minimum harmonic components while operating at a high efficiency.

BRIEF DESCRIPTION

Briefly, in one embodiment of the invention, a power conversion system for supplying a resultant output voltage is provided. The system comprises at least two converter systems each configured for switching at a low frequency and generating a corresponding converter output voltage including a fundamental voltage component and harmonic components. The system further comprises at least two power converter transformers, where each converter system is coupled to a primary winding of a corresponding power converter transformer and is configured for switching with a phase shift. A secondary winding of one power converter transformer is coupled in series to a secondary winding of a second power converter transformer. The resultant output voltage comprises a sum of the fundamental voltage components of each converter output voltage.

In another embodiment, a method for power conversion is provided. The method comprises generating a plurality of converter output voltages each including a fundamental voltage component and harmonic components and generating a resultant output voltage comprising a sum of the fundamental voltage components of the plurality of converter output voltages. The resultant output voltage is substantially free of harmonic components.

In another embodiment, a power conversion system for supplying a resultant output voltage is provided. The system comprises a first converter system configured for generating a first converter output voltage and a second converter system configured for generating a second converter output voltage. The first converter output voltage and the second converter output voltage each include a corresponding fundamental voltage component and corresponding harmonic components. The first converter system and the second converter system are configured for switching with a phase shift. The system further comprises a first power converter transformer comprising a first primary winding and a first secondary winding wherein the first primary winding is coupled to the first converter system and a second power converter transformer comprising a second primary winding and a second secondary winding, wherein the second primary winding is coupled to the second converter system. The first secondary winding is coupled to the second secondary winding in series and the resultant output voltage comprises a sum of the fundamental voltage component of the first converter output voltage and the fundamental voltage component of the second converter output voltage.

In another embodiment, a machine-side power converter system is provided. The system comprises a first machine-side transformer and a second machine-side transformer. The first machine-side transformer and second machine-side transformer are coupled to an electrical machine and a secondary winding of the first machine-side transformer is coupled to a secondary winding of the second machine-side transformer. The system further comprises a first machine-side bridge coupled to the electrical machine via the first machine-side transformer and a second machine-side bridge coupled to the electrical machine via the second machine-side transformer. The system further comprises a direct coupled bridge coupled to the electrical machine via the secondary winding of at least one of the first machine-side transformer and the second machine-side transformer. The system further comprises a controller coupled to the first machine-side bridge, the second machine-side bridge and the direct coupled bridge and configured for actively gating the bridges.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
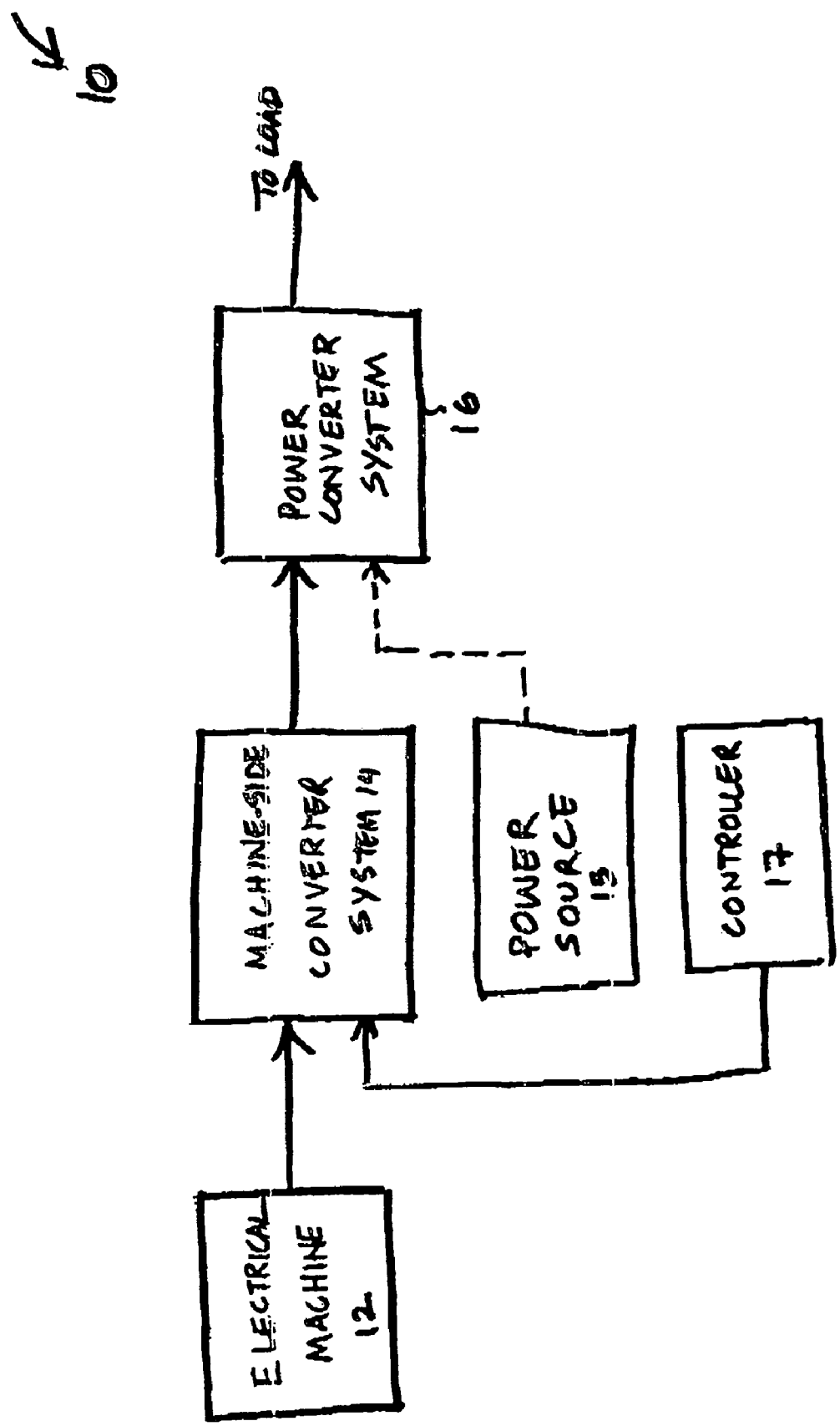
FIG. 1 is a block diagram of one embodiment of a power generation system implemented according to one aspect of the invention.

In one embodiment of the invention a power generation system 10 for providing a resultant output voltage to a load is provided as shown on FIG. 1. The power system comprises an electrical machine 12, a machine-side converter system 14, and a power converter system 16. Each component of the power system is described in further detail below.

Electrical machine 12 is a high power, high frequency machine that may comprise a generator or a motor for example. In the illustrated example, the electrical machine is a high speed, high frequency motor.

Machine side converter system 14 receives ac power generated by the electrical machine and converts the ac power to corresponding dc power, which is then provided to power converter system 16. The machine side converter system is described in further detail with reference to FIG. 4. Controller 17 is coupled to the machine-side converter system and power converter system 16 and is configured to control switching of switching elements (not shown) within the machine-side control system and power converter system.

Power converter system 16 converts the dc power to corresponding ac power which is then provided to the load. Examples of loads include grids, motors, and resistive loads. The power converter system is described in further detail with reference to FIG. 2 and FIG. 3.

Figure 2:
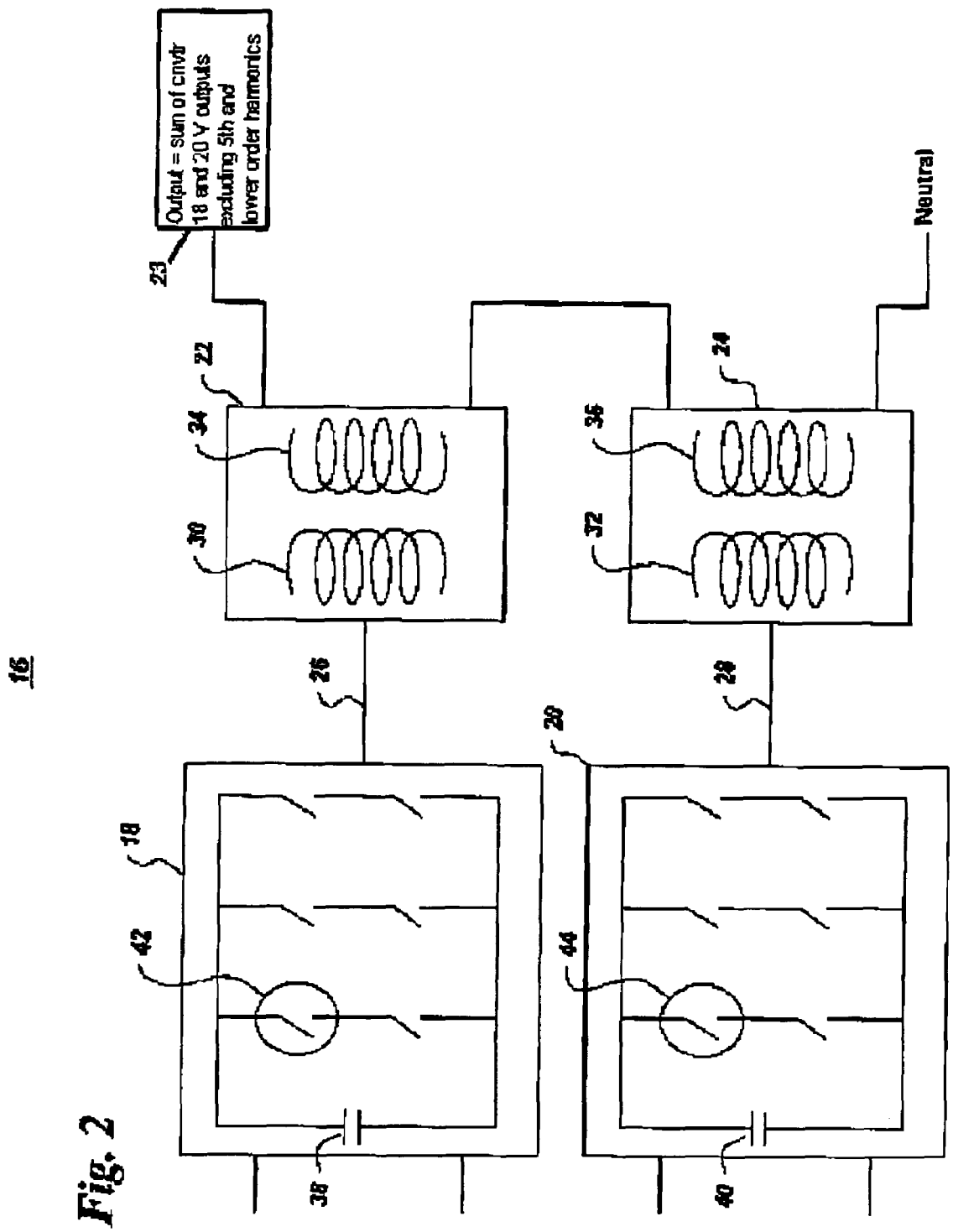
FIG. 2 is a block diagram of one embodiment of a power conversion system implemented according to one aspect of the invention.

FIG. 2 is a block diagram of one embodiment of a power converter system 16 for supplying a resultant output voltage to the load as described with reference to FIG. 1. The power converter system comprises at least two power converter bridges 18 and 20 and power converter transformers 22 and 24. Each component is described in further detail below.

In one embodiment, power converter bridges 18 and 20 receive power from the machine-side power converter system 14 as shown in FIG. 1. In another embodiment, the power converter system 16 receives power from power source 15. Examples of power source 15 include fuel cells, a capacitor or ultra-capacitor based dc link energy storage, and batteries. The power converter bridges are typically configured for switching at a low frequency and generating a corresponding converter output voltage including a fundamental voltage component and harmonic components. The converter output voltage of bridge 18 is generated on line 26 and the converter output voltage of bridge 20 is generated on line 28. In one embodiment, the low switching frequency ranges from 60 Hz to 180 Hz for a fundamental frequency of 60 Hz.

Power converter transformers 22 and 24 are configured to generate the resultant output voltage 23. The resultant output voltage 23 comprises a sum of the fundamental voltage components of each converter output voltage. In one embodiment, the resultant output voltage 23 is substantially free of any harmonic component that exists in the converter output voltages of power converter bridges 18 and 20. Substantially free refers to a resultant output voltage that does not include the $5^{th}$ order harmonic components or lower.

Each power converter bridge 18, 20 is coupled to a primary winding 30, 32 of respective power converter transformer 22, 24. In one embodiment, the primary winding of each power converter transformer comprises a zigzag winding to cause appropriate shifting of the fundamental component as well as the positive and negative sequence harmonic components of the converter output voltage. Typically each power converter transformer comprises a three-phase transformer. In an alternate embodiment, the primary winding comprises a single winding per phase with open neutral.

Secondary winding 34 of power converter transformer 22 is typically coupled to secondary winding 36 of power converter transformer 24 in series. In an alternative embodiment, the secondary windings are coupled in parallel. In a more specific embodiment, the secondary winding of each transformer comprises a single winding per phase with open neutral. In an alternate embodiment, the secondary winding comprises a zigzag winding.

In a more specific embodiment, the power converter bridges are further configured for switching with a phase shift. The gating signals for the power converter bridges are derived so that the fundamental components of the converter output voltages are shifted in phase with respect to one another. The phase-shifted gating signals, particularly when combined with phase shifting in the primary winding of the power converter transformers, results in canceling the low-order harmonic components from the resultant output voltage. The order of harmonics cancelled depends on the number of pairs of converter-transformer units. The number of pairs and level of phase shifting can be selected such that a high power quality resultant output voltage is derived at a relatively low switching frequency.

In a further embodiment, the power converter system is further configured to control an active power flow from the power converter bridges. In a further embodiment, the active power is controlled by controlling a phase angle of the fundamental component of the resultant output voltage.

In another embodiment, the power converter system is further configured to control a reactive power flow from the power converter bridges. In this embodiment, the reactive power is typically controlled by adjusting a resultant magnitude of the fundamental component of the resultant output voltage.

Figure 3:
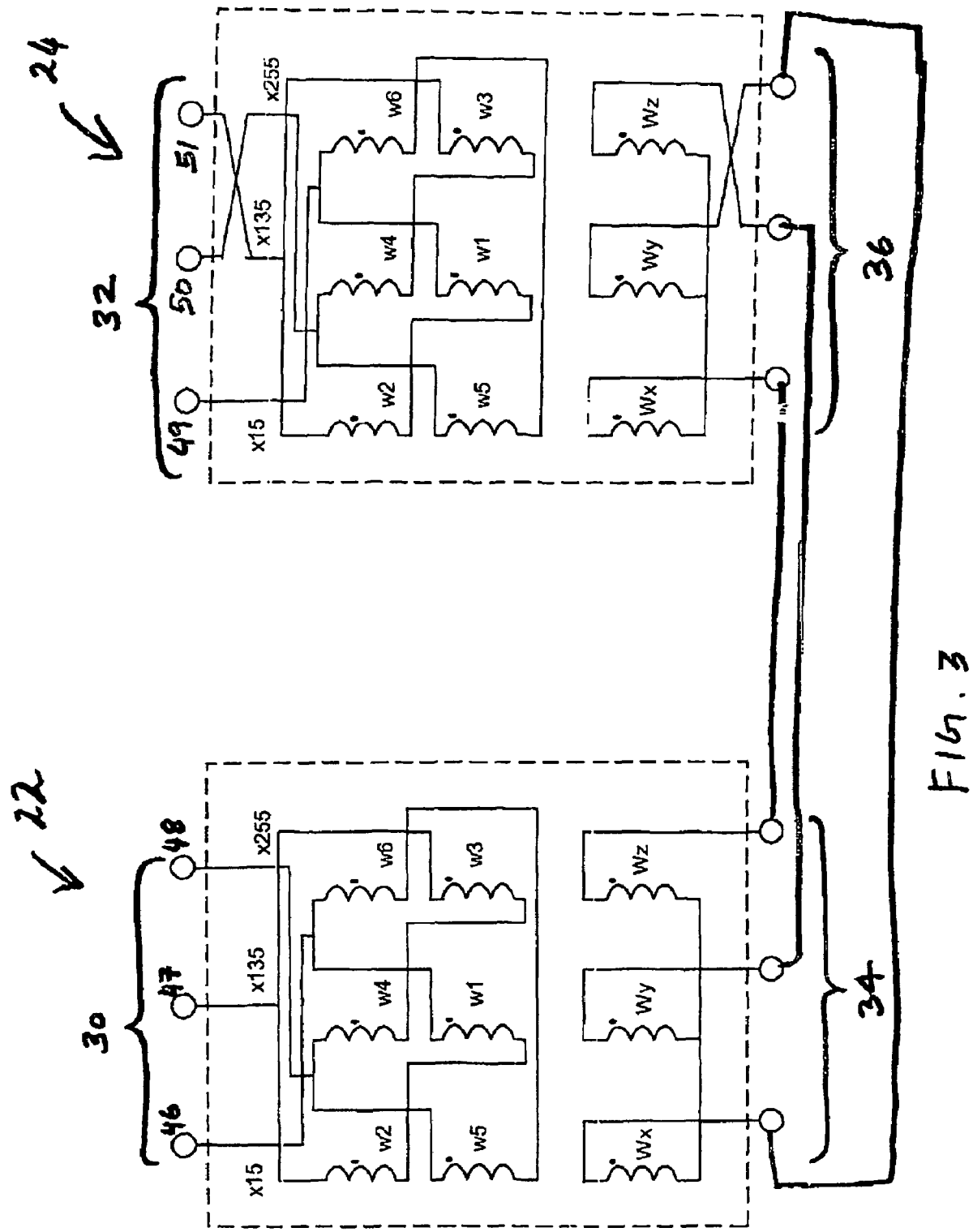
FIG. 3 is a diagrammatic view of one embodiment of the transformers, implemented according to one aspect of the invention.

FIG. 3 is a diagrammatic view of one embodiment of power converter transformer 22 and power converter transformer 24 implemented according to one aspect of the invention. Each limb of each power converter transformer has three windings, two in the primary side and one in the secondary. The primary side windings are connected such that there is an effective phase shift between the phase-neutral voltage of the primary and the secondary. The primary windings are connected to form a closed-polygon, similar to delta connection in a transformer. The secondary windings 34 and 36 are coupled together in series as shown in FIG. 3. It may be appreciated the secondary windings may alternatively be coupled in parallel.

For example, in the arrangement illustrated in FIG. 3, the phase shift for power converter transformer 22 is +15 deg and the phase shift for power converter transformer 24 is −15 deg. Power converter bridge 22 is connected to the points corresponding to terminals 46, 47 and 48 of primary winding 30. Similarly, power converter bridge 24 is connected to the points corresponding to terminals 49, 50 and 51 of primary winding 32.

If the transformers are individually excited with 3-phase voltages having a fundamental and both positive and negative sequence harmonics, then the transformers exhibit the following properties by virtue of their winding connections as shown in FIG. 3. It is assumed that anticlockwise rotation of the phasors is positive. In power converter transformer 22, the fundamental component of the converter output voltage and positive harmonic components are phase shifted by +15 degrees. In other words, secondary voltage leads primary by 15 degrees. The negative harmonic components are phase shifted by −15 degrees.

Similarly, in power converter transformer 24, the fundamental component of the converter output voltage and positive harmonic components are phase shifted by −15 degrees (that is, secondary voltage lags primary by 15 degrees) and the negative harmonic components are phase shifted by +15 degrees. Thus, the harmonic components passing through the power converter bridges and transformers are canceled and a high quality resultant output voltage is obtained.

The converter output voltage generated by the power converter bridges can be shifted from an arbitrary reference by an angle θ. The harmonic component of the converter output voltage subsequently gets shifted by 'n' times θ, where 'n' is the order of the harmonic component. In the example, if θ is equal to −15 degrees for power converter transformer 22, and +15 degrees for power converter transformer 24, the $5^{th}$ and $7^{th}$ harmonic outputs cancel each other when the secondary voltages are combined as shown in table 1 below:

TABLE 1

| Power converter transformer 22 | | Power converter transformer 24 | |
|---|---|---|---|
| Phase shift | +15 | Phase shift | −15 |
| Phase shift in primary voltage | −15 | Phase shift in primary voltage | +15 |
| Harmonic component 1 | 0 | Harmonic component 1 | 0 |
| Harmonic component 5 | −90 | Harmonic component 5 | +90 |
| Harmonic component 7 | −90 | Harmonic component 7 | +90 |

With reference to FIG. 2, power converter bridges 18 and 20 comprise dc links 38 and 40 respectively. In one embodiment, the dc links of each power converter bridge are coupled together either in series or in parallel.

Figure 4:
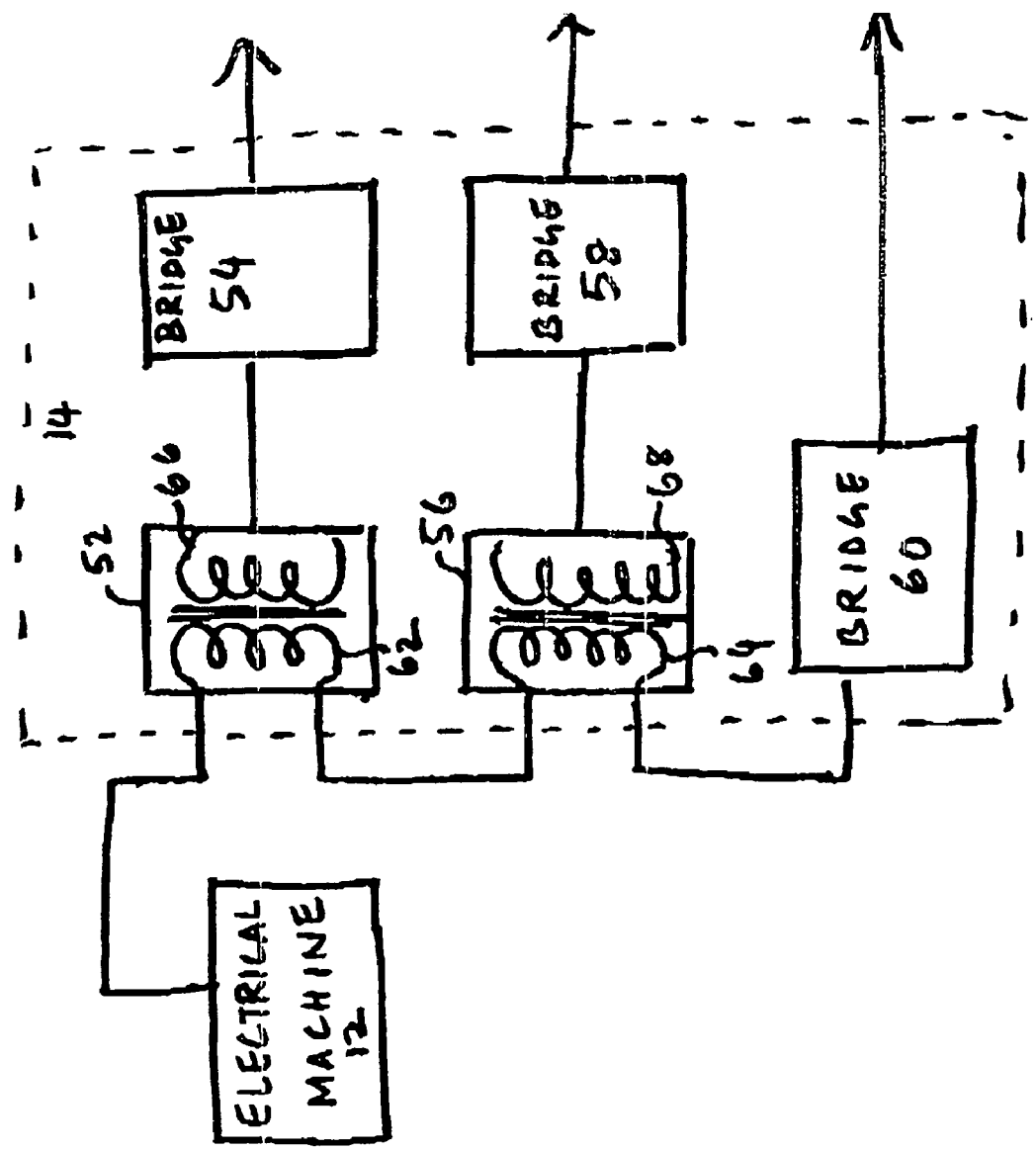
FIG. 4 is a block diagram of one embodiment of a machine-side converter system implemented according to one aspect of the invention.

FIG. 4 is a block diagram of one embodiment of machine-side converter system 14 implemented according to one aspect of the invention. The machine-side converter system 14 comprises two machine-side bridge transformers 52 and 56 and machine-side bridges 54, 58 and direct coupled bridge 60. Each component is described in further detail below.

At least two machine-side transformers 52 and 56 are coupled to electrical machine 12. Secondary winding 62 of machine-side transformer 52 is coupled in series to a secondary winding 64 of machine-side transformer 56.

Machine-side bridges 54 and 58 are each configured for generating a converter system input voltage. Each machine-side bridge is coupled to the electrical machine via the corresponding machine-side transformer. In addition, machine-side bridges 54 and 58 are coupled to primary windings 66 and 68 of machine-side transformers 54 and 56 respectively.

Direct coupled bridge 60 is coupled to the electrical machine 12 via the secondary winding 64 of machine-side transformer 56. Controller 17 (shown in FIG. 1) is coupled to the machine-side bridges 54, 58 and direct coupled bridge 60 respectively. The controller is configured to actively gate the bridges such as to control the machine torque and speed.

Direct coupled bridge 60 is actively gated during a start-up time mode of the electrical machine, which enables the electrical machine to startup without causing any saturation in the transformers. Standard pulse width modulation (PWM) techniques such as sine-triangle modulation, space vector modulation are typically employed for gating direct coupled bridge 60 in this mode.

At a first predetermined speed (depending on the design of the machine-side bridges), machine-side bridges 54 and 58 start gating actively. In one embodiment, machine-side bridges 54 and 58 are actively gated at different instants of time. In an alternate embodiment, machine-side bridges 54 and 58 are actively gated simultaneously. The time depends on a speed of the electrical machine. The sequence of bringing in the bridges to gate actively depends on the required speed and torque of the machine. In a further embodiment, the machine-side bridges are gated using pulse width modulation.

In a further embodiment, the switching technique is changed from conventional PWM to multi-pulse modulation with notch width control. The switching frequency of the machine-side bridges is kept at a minimum to enable control of active and reactive powers in the machine-side bridges. The width of the notches influences the voltage magnitude and hence the flow of reactive power. The flow of active power is determined by the phase of the output voltage. The switching of machine-side bridges 54, 58 and direct coupled bridge 60 are synchronized to a fundamental frequency required by the electrical machine. The phases at which the individual machine-side bridges are switched are shifted from the net fundamental voltage by an angle determined by the phase of individual transformers.

The phase shift in the individual transformers in conjunction with the phase shift of the individual machine-side bridges enables cancellation of low order harmonics resulting in a multilevel voltage on the summed secondary terminal. The cancellation of the low order harmonics is similar to the description of FIG. 2 and FIG. 3. The number of levels depends on the number of bridge-transformer combinations.

The machine-side bridges of the machine-side converter system may be switched in a similar manner as the power converter of FIG. 2, such that the low order harmonics are cancelled, thereby providing high power quality output at the electrical machine.

Figure 5:
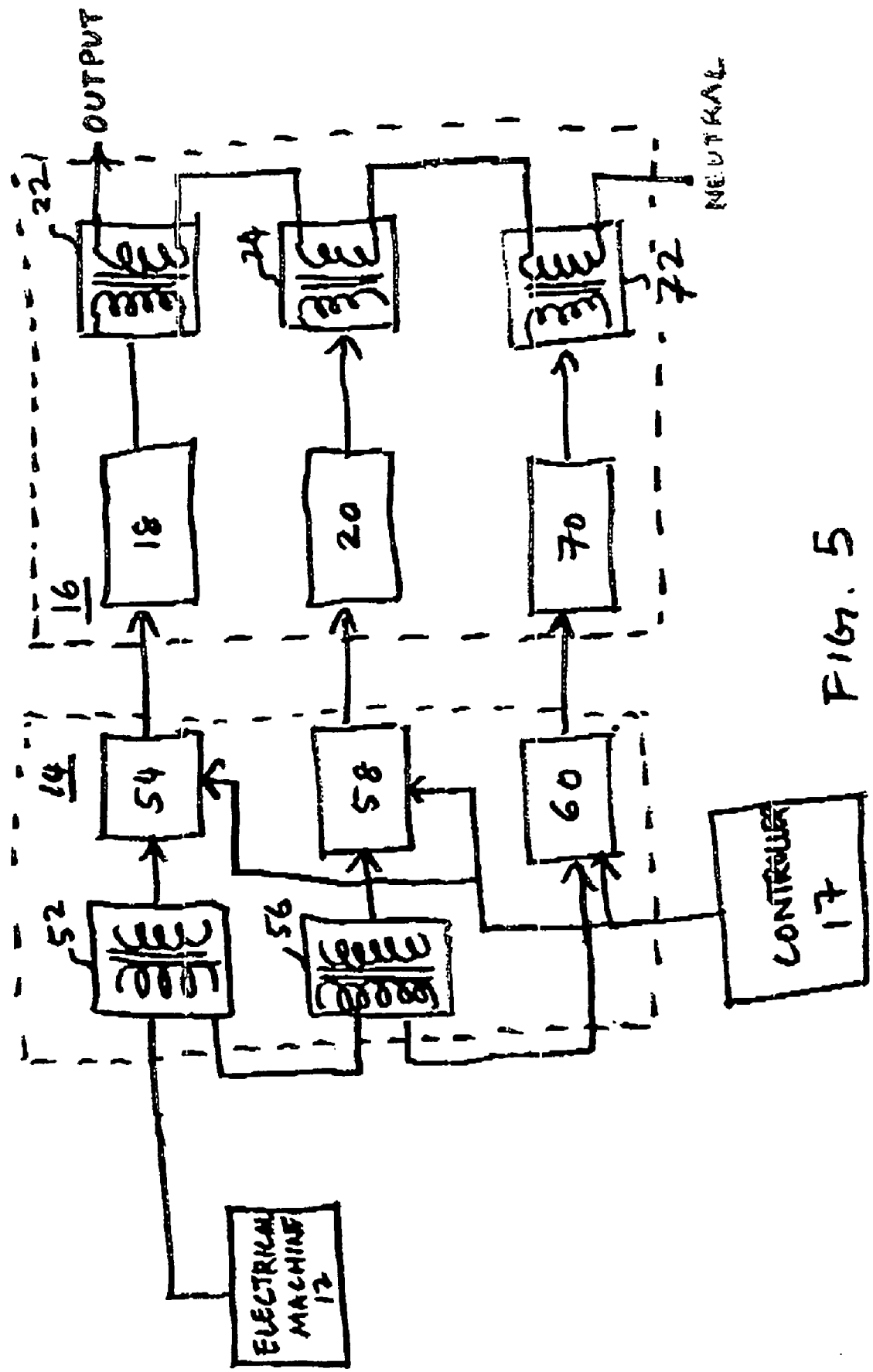
FIG. 5 is a block diagram of a specific embodiment of the power generation system.

FIG. 5 is a block diagram of a specific embodiment of a power generation system 10. Electrical machine 12 comprises an electrical motor. The ac power generated by the electrical motor is provided to the machine-side converter. The machine side converter 14 is implemented as described in FIG. 4. The machine side converter converts the ac power to high quality dc power.

The power converter system 16 comprises three power converter bridges 18, 20 and 70 respectively. The bridges are coupled to power converter transformers 22, 24 and 72 respectively. The power converter system 16 is implemented in a similar manner to the power converter system described in detail in FIG. 2 and FIG. 3.

The power converter system 16 is configured to convert the high quality dc power to corresponding ac power. The ac power generated is of high quality as it is substantially free of harmonic components. The high quality ac power is supplied to various loads.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power generation system for supplying a resultant output voltage, the system comprising:
a power converter system comprising:
at least two power converter bridges each configured for switching at a low frequency and generating a corresponding converter output voltage including a fundamental voltage component and harmonic components;
at least two power converter transformers, wherein two primary side windings of each respective transformer are connected such that there is an effective transformer phase shift between the phase-neutral voltage of the transformer primary and secondary sides, wherein each power converter bridge is coupled to a primary winding of a corresponding power converter transformer;
a controller coupled to the power converter bridges and configured for switching at least one converter bridge with a bridge phase shift such that the fundamental voltage components are in phase with respect to one another;
wherein a secondary winding of one power converter transformer is coupled to a secondary winding of a second power converter transformer;
wherein the resultant output voltage comprises a sum of the fundamental voltage components of each converter output voltage, wherein the bridge phase shift and the effective transformer phase shift together are configured to cancel desired harmonics such that the resultant output voltage does not include fifth order harmonics or lower harmonics.

2. The system of claim 1, wherein the secondary winding of the one power converter transformer is coupled in series to the secondary winding of the second power converter transformer.

3. The system of claim 1, wherein the secondary winding of the one power converter transformer is coupled in parallel to the secondary winding of the second power converter transformer.

4. The system of claim 1, wherein each power converter transformer comprises a three-phase transformer.

5. The system of claim 4, wherein the primary winding of each power converter transformer comprises a zigzag winding and the secondary winding of each power converter transformer comprises a single winding per phase.

6. The system of claim 4, wherein the primary winding of each power converter transformer comprises a single winding per phase and the secondary winding of each power converter transformer comprises a zigzag winding.

7. The system of claim 1, wherein each power converter bridge comprises a dc link and wherein the do link of each power converter bridge is coupled together in series.

8. The system of claim 1, wherein each power converter bridge comprises a dc link and wherein the dc link of each power converter bridge is coupled in parallel.

9. The system of claim 1, wherein the power converter system further comprises a third power converter bridge and a third power converter transformer.

10. The system of claim 9, further comprising:
a machine-side converter system comprising:
at least two machine-side transformers coupled to an electrical machine, each comprising a secondary winding coupled to a secondary winding of at least one other machine-side;
at least two machine-side bridges each configured for generating a converter system input voltage; wherein each machine-side bridge is coupled to the electrical machine via the corresponding machine-side transformer; and wherein each machine-side bridge is coupled to a primary winding of the corresponding machine-side transformer, and
a direct coupled bridge coupled to the electrical machine via a secondary winding of one of the machine-side transformers, wherein an output of the direct coupled bridge is coupled to the third power converter bridge; and
wherein the controller is coupled to the first machine-side bridge, the second machine-side bridge and the direct coupled bridge and configured for actively gating the bridges; and wherein the controller is further configured for actively gating the direct coupled bridge during a start-up time of the electrical machine.

11. The system of claim 10, wherein the controller is configured to actively gate the at least two machine-side bridges at different instants of time, wherein the different instants of time depend on a speed and torque of the electrical machine.

12. The system of claim 10, the controller is configured to actively gate the at least two machine-side bridges at a same instant of time, wherein the time depends on a speed of the electrical machine.

13. The system of claim 10, wherein the controller is configured to actively gate the at least two machine-side bridges using pulse width modulation.

14. A power converter system for supplying an output voltage, the system comprising:
a first converter configured for generating a first converter output voltage;
a second converter configured for generating a second converter output voltage, wherein each of the first converter output voltage and the second converter output voltage includes a phase-shifted corresponding fundamental voltage component and a corresponding harmonic components such that the fundamental voltage components are in phase with respect to one another;
a first power converter transformer comprising a first primary winding and a first secondary winding; wherein the first primary winding is coupled to the first converter;
a second power converter transformer comprising a second primary winding and a second secondary winding wherein two primary side windings of each respective transformer are connected such that there is an effective transformer phase shift between the phase-neutral voltage of the transformer primary and secondary sides;
a controller coupled to the converters and configured for switching at least one converter with a converter phase shift to create the phase-shifted corresponding fundamental voltage component and corresponding harmonic components,
wherein the second primary winding is coupled to the second converter;
wherein the first secondary winding is coupled to the second secondary winding in series,
wherein the output voltage comprises a sum of the fundamental voltage component of the first converter output voltage and the fundamental voltage component of the second converter output voltage, wherein each converter phase shift and its corresponding effective transformer phase shift together are configured to cancel desired harmonics such that the output voltage does not include fifth order harmonics or lower harmonics.

15. The system of claim 14, wherein each of the first power converter transformer and the second power converter transformer comprises a three-phase transformer.

16. The system of claim 14, wherein each of the first primary winding and the second primary winding comprises a single winding per phase.

17. The system of claim 14, wherein the output voltage is substantially free of harmonic components.

18. The system of claim 14, wherein the first converter and the second converter are further configured for switching at a low frequency.

19. The system of claim 18, wherein the low frequency ranges from the fundamental frequency to about three times the fundamental frequency.

20. The system of claim 14, wherein each of the first primary winding and the second primary winding are coupled to form zigzag winding.

21. The system of claim 20, wherein the first primary winding and the second primary winding are coupled to form a closed polygon.

22. The system of claim 14, wherein each of the first secondary winding and the second secondary winding are coupled to form a zigzag winding.

23. The system of claim 22, wherein the first secondary winding and the second secondary winding are coupled to form a closed polygon.

24. The system of claim 14, wherein each the first power converter transformer and the second power converter transformer comprises a three-phase transformer.

25. The system of claim 14, wherein the first converter further comprises a first dc link and the second converter further comprises a second dc link.

26. The system of claim 25, wherein the first dc link is coupled to the second dc link in series or parallel.

27. The system of claim 25, wherein the first dc link is isolated from second dc link.

28. The system of claim 14, wherein the power converter system receives power from a fuel cell.

29. The system of claim 14, wherein the power converter system receives power from a battery.

30. The system of claim 14, wherein the power converter system receives power from a capacitor or ultra-capacitor based dc link energy storage.

31. A machine-side power converter system comprising:
a first machine-side transformer;
a second machine-side transformer, wherein the first machine-side transformer and second machine-side transformer are coupled to an electrical machine, wherein a secondary winding of the first machine-side transformer is coupled to a secondary winding of the second machine-side transformer, wherein two primary side windings of each respective transformer are connected such that there is an effective transformer phase shift between the phase-neutral voltage of the transformer primary and secondary sides;
a first machine-side bridge coupled to the electrical machine via the first machine-side transformer;
a second machine-side bridge coupled to the electrical machine via the second machine-side transformer;
a direct coupled bridge coupled to the electrical machine via a the secondary winding of one of the first machine-side transformer or the second machine-side transformer, and
a controller coupled to the first machine-side bridge, the second machine-side bridge and the direct coupled bridge and configured for actively gating the bridges with a bridge phase shift such that machine-side bridge generates a fundamental voltage component that is in phase with respect to the other machine-side bridge fundamental voltage component and further such that the bridge phase shift and the effective transformer phase shift together are configured to cancel desired harmonics such that a resultant output voltage does not include fifth order harmonics or lower harmonics.

32. The system of claim 31, wherein the controller is configured to actively gate the direct coupled bridge is during a start-up time of the electrical machine.

33. The system of claim 31, wherein the controller is configured to actively gate the first machine-side bridge and the second machine-side bridge at different instants of time; wherein the different instants of time depends on a speed and torque of the electrical machine.

34. The system of claim 31, the controller is configured to actively gate the first machine-aide bridge and the second machine-side bridge at a same instant of time;
wherein the time depends on a speed and torque of the electrical machine.

35. The system of claim 31, wherein the controller is configured to actively gate the first machine-side bridge, the second machine-side bridge and the direct coupled bridge using pulse width modulation.

36. The system of claim 31, wherein the controller is configured to actively gate the first machine-side bridge, the second machine-side bridge and the direct coupled bridge multi-pulse modulation with notch width control.

* * * * *